Patented Sept. 1, 1942

2,294,875

UNITED STATES PATENT OFFICE 2,294,875

PROCESS OF PREPARING COATING MATERIALS

Paul L. Hexter and Russell Shepheard, Cleveland, Ohio, assignors to The Arco Company, Cleveland, Ohio No Drawing. Application May 23, 1941, Serial No. 394,950

8 Claims. (Cl. 117—37)

This invention relates to coating materials and processes of preparing coating materials, which when combined and applied to a surface, produce a surface coating having a high infrared reflectance value.

A principal object of the present invention resides in the method of preparing coating materials to the desired visual color characteristics and further providing the desired infrared reflectance values.

Another object of the present invention resides in the method of preparing coating materials such as paints, lacquers and the like to match the color of natural foliage and possessing the high infrared reflectance value of natural foliage.

A further object of the present invention is to provide a method of preparing a coating material, visually transparent while possessing a high infrared transmittance and/or reflectance value.

The visible range of the spectrum forms only a small part of the whole. On either side of the visible spectrum there exists invisible radiation which is somewhat similar to the visible area termed light.

On the one side and beyond the visible violet is the ultraviolet or the short wave band area, and on the opposite side and below the visible red is the infrared area or long wave band area.

Photographically, today, the region having wave lengths beyond 700 millimicrons is used extensively in aerial photography more especially because of haze penetration resulting in sharper, well defined pictures.

It is well known to those skilled in the art of infrared photography, that radiation from this region of the spectrum and radiation from the visible region of the spectrum are reflected quite differently by a great many common objects. Probably the most outstanding example of this phenomena is found when photographing natural growing foliage.

All green leaves contain chlorophyll, a substance or substances not as yet completely understood, either as to substance or action. Chlorophyll may be viewed as a catalysis or simply as a color screen. It is, however, recognized today as the foremost plant pigment. It is positively known that visible light falling on a leaf is largely absorbed, while the invisible infrared radiation is largely reflected. This reflection is produced by the leaf structure, i. e. the chlorophyll being transparent to infrared, permits the leaf structure to redirect the infrared rays back in the direction of the infrared source.

In photographing natural foliage with normal type photographic materials, such as ordinary orthochromatic or panchromatic materials, the foliage registers in the scale of gray tones. However, when an infrared sensitive film or plate is used in combination with a filter which eliminates the visible region of the spectrum, but includes the infrared region, the resultant developed photograph shows the foliage as white, indicating a definite high infrared reflectance value of the green foliage. Similar images are impressed on the optical senses when the user used an optical instrument capable of blacking out the visible spectrum areas.

The invention is possibly best described when taken in connection with the art of camouflage, and more especially as it relates to war time camouflage. In this work it is highly desirable to prepare the surfaces to be camouflaged with a coating of paint or other coloring materials that visually correspond to the surrounding foliage.

With the development and advancement of the art of camouflage, came the need to penetrate the same, with the result that infrared photography and other optical devices are now used to differentiate between the natural foliage and the artificial or camouflaged object, and through the art of infrared sensitive photographic films and viewing instruments the value of artificial camouflage has been greatly reduced.

It should again be noted that natural green foliage such as leaves, grass, vines and the like, reflects infrared radiation, and when photographed by infrared photography or viewed through filters susceptible only to infrared waves, discloses all this material as white.

An army tank or other mechanism that is completely and perfectly visually camouflaged by the use of dark green, olive drab or similar colored lacquer, paint or coating material, would be hidden from the eye when placed among green foliage or positioned in a forest, and ordinary photography or vision would not disclose the location of the said mechanism, but when photographed through the medium of infrared photography, nature's greens reveal a white mass, while the coated or camouflaged mechanism in the manner that they are coated today, stands out in bold relief, disclosing the tremendous contrast between the white of the leaves and the gray or black of the treated or coated mechanism. Visually the camouflage was a complete success, but the infrared negative or print penetrated the camouflage and disclosed the mechanism's location.

It is, therefore, obvious that a coating material producing the desired visual characteristics and possessing a high infrared reflectance value equal to that provided by natural green foliage and the like, is of tremendous importance, and would be a decided advantage, especially for military requirements over the present camouflage material now used.

After long and expensive research, applicants have developed coating materials and methods of preparing coating materials and the like such as lacquer, paint, etc., that when applied to the object to be coated, will produce the desired visual color characteristics and possess the desirable infrared reflectance and transmittance values.

The most desirable color for war time camouflage yet developed is provided by using the United States Government formula using the following ingredients:

Minimum of total solids—60%.

67% to 75% of the total solids to contain the following pigments:

Iron oxide, carbon black, lead chromate, in proportions required to match U. S. Army standard.

Extender base in proportions deemed necessary by the manufacturer.

When the pigments are prepared to form coating material, the resultant color is the United States standard "Lusterless Olive Drab"—as used today.

The resultant color coating material produced by use of this formula, namely "Olive Drab", possesses no infrared reflectance value, in fact pigments provide a high infrared absorbing value, and is a green which closely matches the natural green foliage. Visually this formula is highly efficient, but when photographed through the medium of infrared photography or viewed through infrared filters, the coated object appears black or dark gray on the photograph in direct contrast to the natural foliage, which is indicated on the print as white.

It is obvious, therefore, that camouflage coating material produced by the said formula when applied to objects to be camouflaged, is of little or no value when the objects are positioned among natural foliage, except as and when visually observed.

By the present invention any desired color or colors may be prepared, and more especially in the range covering the darker tones, shades or color having desirable visual color characteristics and also possessing the desired infrared reflectance value.

The above mentioned United States Government "Olive Drab" formula can be perfectly matched, having all of the visual characteristics such as color, non-glare, lusterless and any desired surface characteristic, yet possessing the desired maximum infrared reflectance value. It should be understood that other formulations following the principle of this invention having either glossy or flat surfaces, all possess the same inherent characteristics.

It should be further understood that several formulations may be used to produce the result disclosed in this invention, several of which are here given.

Typical pigment formulations in accordance with this invention and producing a coating material visually matching the standard United States Government "Olive Drab."

Example 1

| | Per cent |
|---|---|
| Chrome oxide | 12 |
| Toluidine maroon | 1.2 |
| Asbestine | 8 |
| Silica | 23.5 |

Example 2

| | Per cent |
|---|---|
| Chrome yellow | 10 |
| Cerulean blue | 1.5 |
| Toluidine maroon | .9 |
| Silica | 30.8 |

These percentages hold for the particular sources as used.

Any of the well known common paint, lacquer, varnish or cold water binders for the above pigments may be mixed therewith to provide a complete coating material.

It should be noted in the above typical example that the pigments listed possess substantially no infrared absorbing qualities as all of them either reflect or are transparent to infrared radiation, yet they are visually a perfect match for U. S. Army standard. For example, in Formula 1 the chrome oxide and silica both possess high infrared reflectance values and the toluidine maroon and asbestine both possess infrared transmittance values.

In Formula 2 the chrome yellow and silica both possess high infrared reflectance values, and the cerulean blue and toluidine maroon both possess infrared transmittance values.

Colors made from pigments which give a visual sensation of yellow, orange, red and white, can all be said to have high infrared reflectance values.

Obviously other colors may be provided by applying the principle of selective pigmentation as set forth in this invention wherein the use of pigments possessing high infrared transmission values are used, especially the inert and opaque pigments.

In providing lighter colors such as "apple green" the following is an example for the pigment formulation.

| | Per cent |
|---|---|
| Light chrome yellow | 14.7 |
| Cerulean blue | 2.1 |
| Silica | 25.2 |

To this pigment is added any common paint, lacquer, varnish or cold water vehicle.

In providing dark colors such as "medium brown," the following is used for the pigment formulation:

| | Per cent |
|---|---|
| Chrome yellow | 15.2 |
| Toluidine maroon | 1.5 |
| Silica | 25.2 |

All of the formulations to be used must include pigments having high infrared reflectance values combined with pigments having high infrared transmittance values, as any appreciable amount of infrared absorbing pigment present in the coating material will result in undesired infrared absorbing qualities, thus rendering the product worthless as an infrared reflecting coating.

Colors made from pigments which give a visual sensation of yellow, orange, red and white can all be said to have high infrared reflectance values.

While average human vision stops at 760 mu., a curve of the red part of the spectrum continues beyond this into the infrared end of the spectrum and any color whose spectral analysis shows high reflectance in the red will also show this high reflectance in the infrared, and for this reason the majority of yellows, oranges, reds and whites show high infrared reflectance. The darker pigments such as blues, greens, browns, as a general rule show little or no reflectance in the visual red end of the spectrum and, therefore, none in the infrared end.

There have been prior suggestions of examining pigments and dyes under infrared light with the idea of classifying such materials as reflectors or absorbers of infrared, although the results of these previous studies and those conducted by the present inventors are at variance in a number of cases.

The instant inventors have discovered a number of materials satisfactory for paint films which are visually opaque and give to the eye a sensation of very dark colors, yet to infrared are absolutely transparent. At the beginning of their research the applicants used the common practice of rubbing up by hand in a glass muller a given amount of pigment with a given amount of oil. This rub up was then applied on white cardboard and it was found that pigment which is visually opaque will cover the white cardboard solidly, yet it can be transparent to infrared and permit the infrared rays to freely pass through it to be reflected back by the white surface of the cardboard. Such a pigment would ordinarily be classified as a reflector of infrared when actually it is transparent to infrared and the base over which it is applied is the reflector.

Similarly when these rub ups were applied on steel panels such infrared transparent, visually opaque materials, were classified erroneously as infrared absorbers. They, however, are transparent to infrared and the infrared rays pass freely through the material to be absorbed by the surface underneath. Thus the surface underneath is the absorber of infrared, not the pigment, which is transparent to infrared.

The important contribution of the present inventors is the discovery that certain pigments, dyes, toners, lakes, etc. possessing good covering properties and visually giving the sensation of dark colors are actually transparent to infrared rays and such dark colors can be mixed with the yellows, reds, oranges and whites which are known infrared reflectors, so that visually any desired color can be produced, but under infrared light total reflection can be obtained.

The infrared values and characteristics of any pigment, dye or the like may be quickly and easily secured through the medium of infrared photography, although other means may be used to secure this information. The pigments, dyes, or the like are individually photographed by means of infrared photography, which provides definite means for determining the desirable characteristics, and only pigments, dyes or the like possessing high infrared reflectance values, and high infrared transmittance values can be used on surfaces possessing infrared absorbing characteristics. However, where the base surface possesses high infrared reflectance characteristics, then the surface coating material should have high infrared transparent or reflectance characteristics.

For example, it is known through the use of the above described method, that chrome yellow possesses an excellent and extremely high infrared reflectance characteristic, but with the addition of only 1% of carbon black, which is highly absorbent to infrared rays, the carbon black will obliterate all of the reflectance characteristics possessed by the chrome yellow, thereby nullifying the desired reflectance values of the chrome yellow.

It should be further understood that several factors are involved in obtaining the desired results of a coating material possessing the necessary characteristics to produce an infrared reflectance when photographed by infrared photography, or viewed through infrared sensitive instruments.

These factors include the base on which the coating is applied, the coating applied, and the surface applied to a coated surface.

Where the base or coated base possess the characteristic of an infrared absorber, it is of the utmost importance to provide a coating therefore having high infrared reflectance values and void of any infrared transparent characteristics, although, as before disclosed, such a coating may be made by combining high infrared reflecting pigments with small amounts of infrared transparent pigments, with the result that the coating produced photographs similar to the totally reflecting coating. On the other hand, where the base or coated base possesses the characteristics of an infrared reflector, and it is desired to change or alter the visual color of the said base or coated base, then the coating material to be used for this purpose can be made from high infrared transparent materials or a combination with infrared reflecting materials. The resulting coating while possessing transparency in the infrared depending upon the amounts of both types of pigments used to secure the desired visual color will photograph properly due to the base over which the coating is applied.

The prime object of the invention is to provide definite means of redirecting infrared rays falling on the object or objects coated with a material produced by means of this invention, wherein the objects possess the desirable visual characteristics, and when photographed through the medium of infrared photography or viewed through infrared filter reveals on the negative or to the eye reflectance of the infrared radiations.

What we claim is:

1. A coating composition having a visual dark color of any desired hue composed of some pigments having high infrared transmittance characteristics and some having high infrared reflectance values.

2. The production of colors for camouflage of military equipment, comprising blending a combination of pigments to produce a natural foliage tint using pigments having a high infrared reflectance value and adding thereto color bodies possessing high infrared transmittance value whereby visually the resultant colors closely resemble natural foliage tints, and when photographed on infrared emulsions produce thereon approximately the infrared reflectance value of natural foliage.

3. The method of preparing coating materials which includes adding to conventional coating materials color bodies selected from the group including pigments, toners, dyes and lakes having reflectance and transmission values of long light waves in the invisible spectrum greater than the same values possessed by the materials of the conventional coating.

4. The method of preparing a visually dark colored coating material which comprises initially forming a conventional paint and thereafter blending with said conventional paint color bodies selected from the group possessing infrared reflectance and transmission values substantially equal to the said values possessed by green hued vegetation.

5. A visually olive drab coating composition possessing high infrared reflecting characteristics composed mainly of infrared reflecting bodies and to a lesser degree infrared transmissive bodies.

6. A visually olive drab coating composition having substantially similar infrared reflecting characteristics to nature's deciduous greens, said coating composition containing a major portion of infrared reflecting bodies and a minor portion of infrared transmissive bodies.

7. A durable surface coating composition comprising a film forming, air hardening suspension of visually dark pigments in a liquid vehicle, some of said pigments being selected from the group of pigments displaying the characteristics of reflectance of invisible light waves above 700 millimicrons in length and some of said pigments displaying the similar characteristic of transmission of invisible light waves about 700 millimicrons in length.

8. A visually dark durable surface coating material composed of pigments suspended in a liquid vehicle, said pigments being primarily transmissive and reflective of infrared light waves, without adsorption of said infrared light waves.

PAUL L. HEXTER.
RUSSELL SHEPHEARD.